United States Patent [19]

Perlman

[11] Patent Number: 5,005,074
[45] Date of Patent: Apr. 2, 1991

[54] ADAPTIVE MULTISTANDARD VIDEO COMB FILTER

[75] Inventor: Stuart S. Perlman, Princeton, N.J.

[73] Assignee: RCA Licensing Corporation, Princeton, N.J.

[21] Appl. No.: 437,952

[22] Filed: Nov. 17, 1989

[51] Int. Cl.$^5$ .............................................. H04N 9/78
[52] U.S. Cl. ...................................................... 358/31
[58] Field of Search ........................................ 358/31

[56] References Cited

U.S. PATENT DOCUMENTS

| | | | |
|---|---|---|---|
| 4,727,415 | 2/1988 | Nakagawa et al. | 358/31 |
| 4,766,484 | 8/1988 | Clayton et al. | 358/31 |
| 4,803,547 | 2/1989 | Stratton | 358/31 |
| 4,961,108 | 10/1990 | Perlman | 358/31 |

FOREIGN PATENT DOCUMENTS

| | | | |
|---|---|---|---|
| 0004457 | 3/1979 | European Pat. Off. | 358/31 |
| 2054313 | 4/1980 | United Kingdom | 358/31 |
| 2066615 | 12/1980 | United Kingdom | 358/31 |
| 2079091 | 6/1981 | United Kingdom | 358/31 |

Primary Examiner—John W. Shepperd
Assistant Examiner—Wendy R. Greening
Attorney, Agent, or Firm—Joseph S. Tripoli; Eric P. Herrmann; James B. Hayes

[57] ABSTRACT

A multimode comb filter for comb filtering, e.g., NTSC and/or PAL video signals includes delay means for concurrently providing video signals representing three adjacent horizontal lines. First and second combining means coupled to the delay means provide alternate 1−H comb filter signals in both the NTSC and PAL modes. Control circuitry coupled to the delay means generates a control signal for adaptively selecting the one of the alternate 1−H comb filtered signals or appropriate proportions of both alternate 1−H comb filtered signals to form an output comb filtered signal.

12 Claims, 7 Drawing Sheets

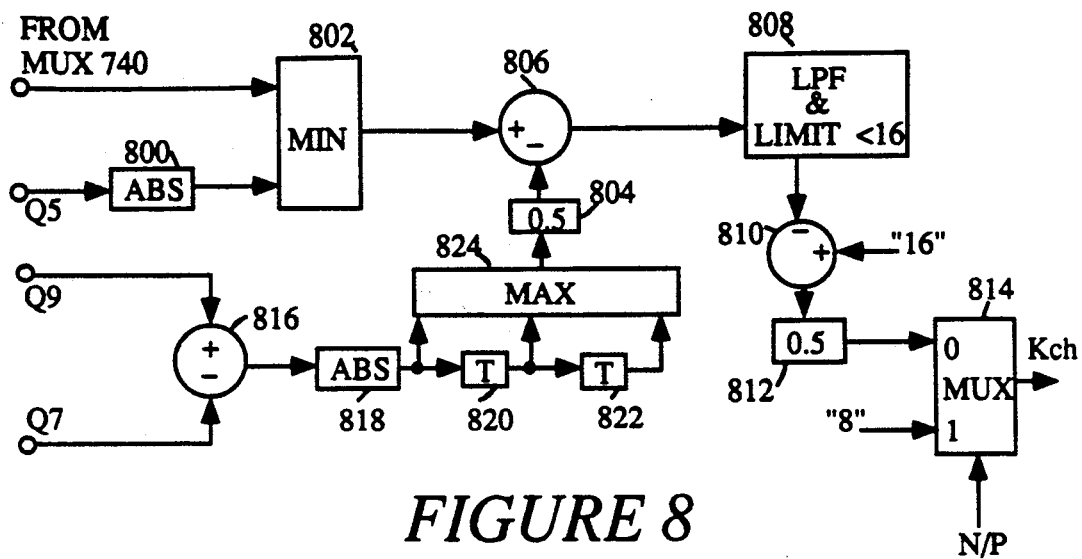
*FIGURE 8*
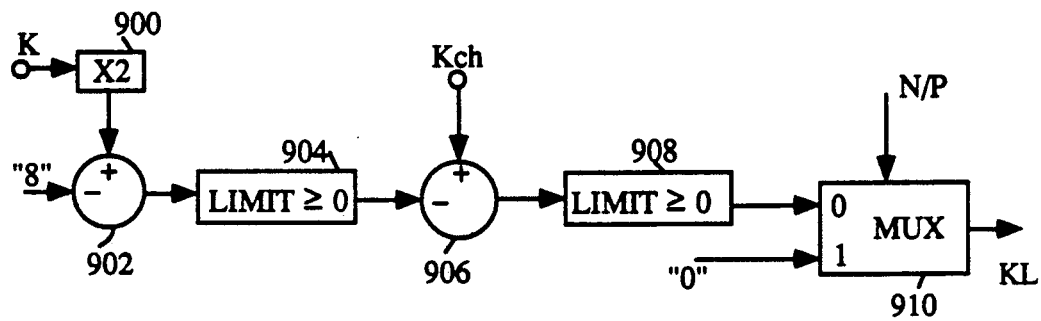
*FIGURE 9*
*FIGURE 10*
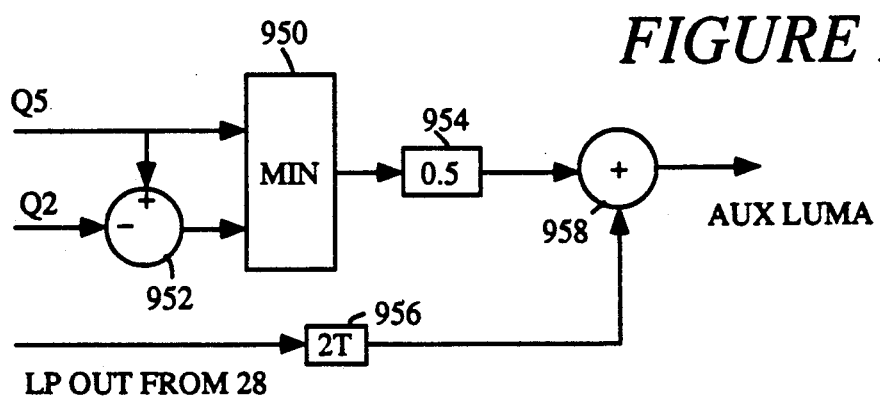

ADAPTIVE MULTISTANDARD VIDEO COMB FILTER

This invention is related to comb filters for processing video signals.

BACKGROUND OF THE INVENTION

In processing video signals, it is known to be particularly advantageous to separate the luminance and chrominance components from composite video signal with comb filters. The reason being that the separated luminance component is of full bandwidth, e.g., 4.2 MHz for NTSC signal, and cross components are substantially eliminated from both of the separated luminance and chrominance components. Typical intraframe comb filters for NTSC video signals include circuitry for combining signals which are displaced in time by an odd integral number of horizontal line periods. Because the phase of the chrominance subcarrier changes by exactly 180° from line to line, additively combining NTSC video signals displaced by one line interval produces a signal in which the luminance components from the two lines constructively combine and the chrominance component is cancelled. Conversely, if the signals are subtractively combined the luminance component is cancelled while the chrominance components from the two lines constructively combine. The vertical resolution of the luminance component is compromised but is acceptable.

PAL signals on the other hand have a chrominance subcarrier which exhibits a 180° phase change every two horizontal line periods. Therefore, typical intraframe PAL comb filters combine video signals which are displaced in time by two horizontal intervals. The PAL comb filter function is basically the same as for the NTSC comb filter however, since the signals that are combined are spatially displaced by two lines, the vertical resolution of the PAL luminance component is significantly impaired, and tends towards not being acceptable.

Yoshimitsu Nakajima et al in an article entitled "Improvement of Picture Quality for NTSC and PAL Systems by Digital Signal Processing", IEEE Transactions on Consumer Electronics, Vol. CE-31, No. 4, November 1989, pp. 642–654 describe adaptive comb filters which combine samples from three successive lines of video signal. In this system, the NTSC embodiment combines samples which are vertically aligned, similar to the aforedescribed typical NTSC and PAL comb filters. The PAL embodiment however combines diagonally aligned samples from adjacent lines. This tends to preserve the vertical resolution of the luminance component, reduces memory requirements for delaying the video signals but tends to have an adverse affect on images containing vertical lines.

Simple comb filters tend to introduce cross components in the separated luminance and chrominance signals where differences exist in the composite signal line-to-line. It is known, however, that such cross components may be significantly reduced by the process of adaptive comb filtering. Examples of adaptive comb filters may be found in U.S. Pat. No. 4,786,963 issued to McNeely et al. and U.S. Pat. No. 4,803,547 issued to Stratton. In adaptive systems, signals from a plurality of adjacent lines are provided. These signals are compared to determine which signals, when combined to provide a comb filter output, will tend to produce the most desirable signal.

In order to realize economies of scale in the manufacture of video signal processing components it is advantageous to produce multistandard processing elements which are useful for, e.g., NTSC and PAL signal systems. To this end it is desirable to have a multistandard comb filter. Shinichi Nakagawa et al. in U.S. Pat. No. 4,727,415 describe an adaptive multistandard comb filter system. In this system, for the NTSC mode, the comb filter adaptively combines composite video samples from adjacent lines of video signal, to produce separated luminance and chrominance components. In the PAL mode, the comb filter adaptively combines composite video samples displaced by two horizontal lines to produce separate luminance and chrominance components. As such, in the PAL mode, there is a loss of vertical resolution.

It is an object of this invention to provide an adaptive multistandard comb filter which provides comb filtered signals without undesirable artifacts and without substantially compromising the vertical resolution for all signal standards serviced by the system.

SUMMARY OF THE INVENTION

This invention is a comb filter for comb filtering at least NTSC signal in a first mode and PAL signal in a second mode. The comb filter includes circuitry for concurrently providing a plurality of video signals including signals from three adjacent horizontal lines designated T (top), M (middle) and B (bottom). In the first mode, combining and control circuitry, responsive to the amplitude of signals from the T, M and B lines, selectively combines signal from the top and bottom lines, in a first polarity sense, with signal from the middle line to provide a comb filtered signal. In the second mode, the combining and control circuitry, responsive to the relative amplitudes of the signals from the T, M and B lines, provides a comb filtered signal representing signal from said middle line combined with signal from said top and bottom lines in said first polarity sense and also in a second polarity sense.

BRIEF DESCRIPTION OF THE DRAWINGS

FIG. 8 is a block diagram of circuitry for providing a control signal Kch, for controlling the circuit element 65 of FIG. 4.

FIG. 9 is a block diagram of circuitry for providing a control signal $K_L$, for controlling the circuit element 74 of FIG. 4A.

FIG. 10 is a block diagram of circuitry for producing an alternative luminance signal.

DETAILED DESCRIPTION

The invention will be generally described in terms of digital processing hardware operating on a digitized (PCM) video signal, however, it will be appreciated that the invention may be practiced on either analog or digital video signals with appropriate selection of circuit elements.

Figure 1:
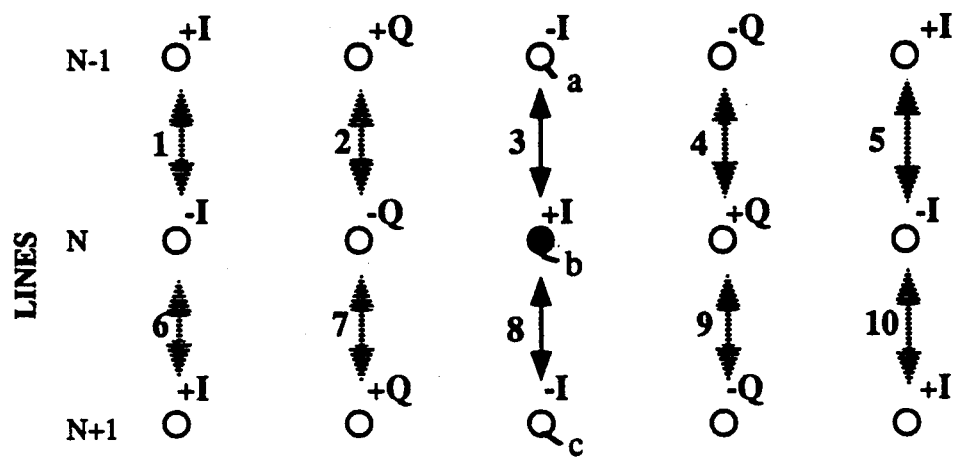
FIGS. 1 and 2 are pictorial representations of video samples from portions of three horizontal video lines for NTSC and PAL signals respectively.

Referring to FIG. 1 the array of circles represent samples of an NTSC video signal from portions of three adjacent horizontal lines. The samples are presumed to have been taken at a rate of four times the color subcarrier frequency with a sampling signal phase locked to the I or Q axis (I and Q being quadrature phase color difference signal components). The darkened or filled circle represents the sample point for which a comb filtered signal is to be currently generated. Since the samples occur at a rate of four times subcarrier and phase locked to the I or Q axis each sample contains I or Q color information exclusively. Note if the applied signal includes a luminance as well as a chrominance component, respective samples may be represented $Y \pm I$ or $Y \pm Q$ where Y represents luminance information. To avoid confusion the Y terms have been omitted in FIGS. 1 and 2.

Because of the aforedescribed sampling method, vertically aligned samples contain like chrominance components. The phase of vertically adjacent samples is however reversed. Assume that samples a, b and c have equal values $(Y-I)_a$, $(Y+I)_b$ and $(Y-I)_c$ respectively. Subtracting sample a from sample b will produce the sample $+2I$ which represents a comb filtered chrominance component of proper phase. Similarly subtracting sample c from sample b will produce the sample value $+2I$. To generate a comb filtered sample representing sample point b in line N, the corresponding vertically aligned sample from either line $N+1$ or line $N-1$ may be combined with sample b. The method for selecting the sample to combine with sample b will be discussed hereinafter. Note in FIG. 1 the dark arrows designated 3 and 8 indicate the pairs of samples which may be combined to generate the comb filtered sample representing point (pixel) b. Similarly, the broken arrows indicate pairs of samples which may be combined to produce comb filtered samples for respective samples along line N. The numbers 1-10 adjacent the respective arrows designate pairs of samples that are used in the adaptive comb filter process, which pairs of samples will be referred to in the description of FIGS. 6-10. For example, sample pair 3 consists of samples a and b and pair 8 consists of samples b and c.

Figure 2:
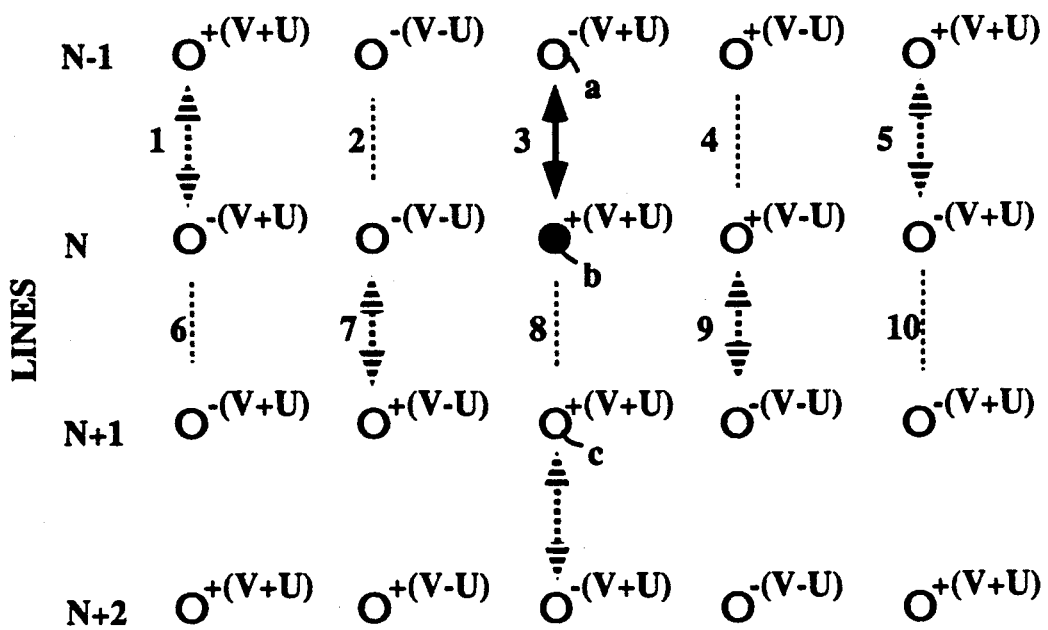

FIG. 2 is a representation of samples from a portion of four lines of a PAL video signal. The PAL signal samples are also presumed to be taken at a rate of four times the color subcarrier frequency. The solid circle represents the pixel location for which the video signal is currently being processed. U and V represent quadrature phase color difference signals. In this instance the sampling signal is phase locked to the color subcarrier at an angle 45° off the U color difference signal axis. As a result the chrominance component at each sample instance includes a contribution from both color difference signals rather than exclusively one or the other of the color difference signals. It is seen however that the values of every second pair of samples between adjacent lines represent like chrominance components with a 180° phase relationship, e.g., pairs 1, 3, 5, 7, etc. A comb filtered chrominance component for sample point or pixel b may be provided by subtractively combining samples a and b. A comb filtered chrominance component for each of the five pixels in line N, starting from left to right may be provided by subtractively combining the sample pairs 1, 7, 3, 9 and 5 respectively. A comb filtered signal of this type is herein defined as a line alternating subtractive comb filtered signal or LASCFS. If the signal represented by the samples of FIG. 2 is composite video this comb filtering process will substantially eliminate the luminance component except where there are line-to-line amplitude variations.

Unlike the NTSC case, vertically opposite pairs of samples are not conducive to subtractive comb filtering because the samples are of like chrominance phase. For example, the pair of samples 8 opposite pair 3 are of the same phase, e.g., $+(V-U)$. Thus, if the comb filtered signal produced by subtractively combining the pair 3 samples is likely to introduce an artifact, one cannot simply select a sample representing the subtractively combined sample representing pair 8 as a substitute signal.

Nominally the energy content of the luminance component within the frequency spectrum occupied by the chrominance component is small. Therefore, if the signal represented by the array of samples of FIG. 2 occupies only the chrominance frequency band, the alternate pairs of samples (e.g., 6, 2, 8, 4 and 10) may be additively combined to provide a substitute chrominance signal. A sequence of samples representing the additive combination of alternating sample pairs 6, 2, 8, 4 and 10 is herein defined as a line alternating additive comb filtered signal or LAACFS. This signal will include the low energy high frequency luminance component. However, depending on the potential error in the subtractive comb filtered signal, it may still be advantageous to substitute the additive comb filtered signal even though it does include some luminance signal.

As in the NTSC case, the relative amplitudes of the respective PAL samples may be monitored to adaptively select which of the LASCFS or LAACFS is to be provided as output signal. Desirably this will be accomplished with a high degree of commonality in the processing hardware for both the NTSC mode of operation and the PAL mode of operation.

Figure 3:
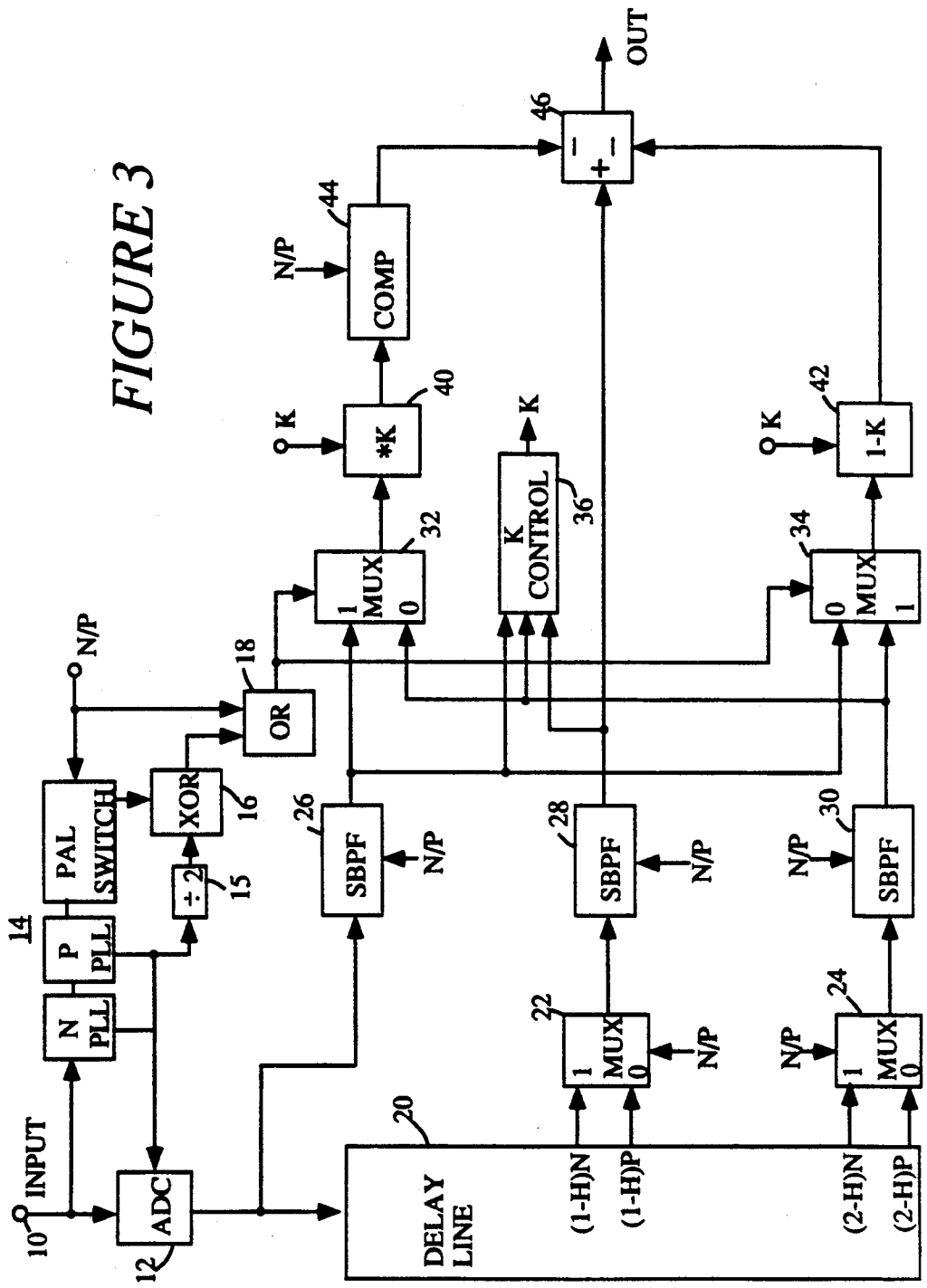
FIGS. 3 and 4 are block diagrams of alternative multistandard adaptive comb filters embodying the present invention.

Refer now to FIG. 3 which illustrates a first embodiment of an adaptive NTSC/PAL comb filter arranged to provide a comb filtered chrominance output signal. Input analog signal which may be a chrominance signal modulating a subcarrier/carrier or composite video having characteristic of either the NTSC standard or the PAL standard is applied at terminal 10 to an analog-to-digital converter (ADC) 12, and to a sampling signal generator 14. Sampling signal generator 14, responsive to a signal N/P, which may be provided by a user operated switch or an automatic standard detector (not shown) develops a sampling signal having a frequency of four times the subcarrier frequency. Generator 14 may include NTSC (N PLL) and PAL (P PLL) phase locked loops, which are respectively selected by the signal N/P, and are responsive to the subcarrier, for generating the sampling signal. The N-PLL develops a sampling signal which is nominally phase aligned to one of the quadrature axes of the subcarrier. The P-PLL develops a sampling signal which is phase aligned 45° from one of the quadrature axes of the subcarrier. In addition the generator 14 includes circuitry for generating a PAL switching signal which is logically high during alternate horizontal line periods and logically low during intervening horizontal line periods. The frequency of the sampling signal is divided by two in divider 15 and applied to one input of an exclusive OR (XOR) gate 16. The PAL switching signal is applied to a second input of the XOR gate. The output of the XOR gate 16 is a signal, synchronous with the sampling signal but of half the rate of the sampling signal, and which is of opposite phase line-to-line. This signal is utilized in the PAL mode to select alternate samples along a horizontal line. The signal from the XOR gate 16 and the control signal N/P are coupled to respective input terminals of an OR gate 18. In this and the following examples the control signal N/P is presumed to exhibit logic one and logic zero states for the NTSC and PAL modes of operation respectively. Therefore, OR gate 18 exhibits a logic one output in the NTSC mode and passes the signal provided by the XOR gate 16 in the PAL mode of operation.

The ADC 12, responsive to the sampling signal from generator 14, produces pulse code modulated (PCM), e.g., binary, representations of the input signal at a sample rate of four times the subcarrier. The PCM samples are applied to a delay line 20 having taps for providing signals delayed by one and two horizontal line intervals for NTSC signals and for PAL signals, (910 and 1820 sample periods for NTSC and 1135 and 2270 sample periods for PAL). The (1−H) NTSC and PAL taps are coupled to a first multiplexer 22 and the (2−H) NTSC and PAL taps are coupled to a second multiplexer 24. Multiplexers 22 and 24 are responsive to the control signal N/P to provide delayed samples from the appropriate taps for the NTSC or PAL operating modes. Input samples applied to the delay line 20 and delayed samples from multiplexers 22 and 24 respectively correspond to vertically aligned samples from three adjacent video lines as exemplified by samples c, b and a in FIGS. 1 and 2.

Figure 5:
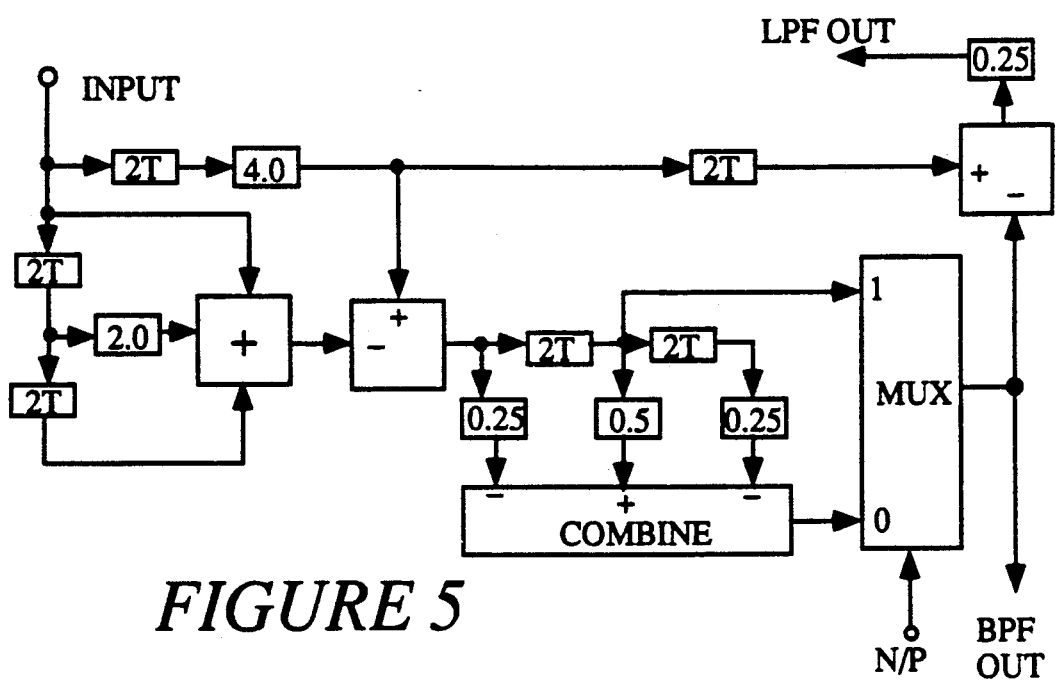
FIG. 5 is a block diagram of an exemplary switchable bandpass filter which may be utilized for elements 26, 28 and 30 in the FIGS. 3 and 4 apparatus.

The signal samples provided by the ADC 12 and multiplexers 22 and 24 are coupled to switchable bandpass filters (SBPF) 26, 28 and 30, respectively. Bandpass filters 26, 28 and 30 only pass signal in the frequency band normally occupied by the chrominance signal, and are responsive to the control signal N/P to select the appropriate NTSC or PAL chrominance frequency band. FIG. 5 illustrates an exemplary SBPF which may be used for filters 26, 28 and 30. This is a straight forward design and will not be described in detail. The blocks labeled 2T are delay elements for delaying samples by two sample periods. The blocks labeled with a decimal number are weighting circuits for scaling the value of the samples by the respective decimal factor. It is to be noted that the FIG. 5 filter arrangement includes both a low pass output (LPF) and a bandpass output (BPF). The BPF output provides the samples which are combined to form the comb filtered signals. The LPF output is utilized in the adaptive control circuitry.

Referring again to FIG. 3, the BPF output from the SBPF filters 26 and 28 are each coupled to respective input terminals of two multiplexers 32 and 34. The output of the SBPF 28 is coupled to a first input of a combining circuit 46. The output of multiplexer 32 is coupled to a second input of the combining circuit 46 via a scaling circuit 40 and a polarity inverting circuit 44, and the output of multiplexer 34 is coupled to a third input of the combining circuit 46 via a scaling circuit 42.

Scaling circuits 40 and 42 are responsive to a control signal K for scaling sample values by K and 1−K respectively, where K is nominally equal to values between 0 and 1 inclusive. The values of K are provided by the adaptive K control circuit 36 which is responsive to signal provided by the filters 26–28. The polarity inverting circuit is responsive to the mode control signal N/P to pass samples unaltered in the NTSC mode and to complement samples in the PAL mode.

In the NTSC mode of operation the multiplexers 32 and 34 are conditioned by the signal provided by OR gate 18 to respectively pass samples provided by SBPF 26 and SBPF 30. Refer to FIG. 1 and consider pixel b. The desired comb filtered output is (b−a) or (b−c) or more generally $$\text{OUT} = K(b-c) + (1-K)(b-a) \quad (1)$$

where K ranges from zero to one. When the sample representing pixel b is provided by SBPF 28, then SBPF 26 and SBPF 30 provide samples c and a. The sample provided by scaling circuit 40 and polarity inverting circuit 44 is (K)c and the sample provided by scaling circuit 42 is (1−K)a. Combining circuit 46 combines the signals b, (1−K)a and Kc according to the relationship $$\text{OUT} = b - Kc - (1-K)a \quad (2)$$

which can be shown to be equivalent to equation 1.

Next consider the PAL mode and assume that comb filtered samples representing line N of FIG. 2 are generated. In this instance the polarity inverter 44 is conditioned by the mode control signal N/P to complement applied signals. The multiplexer 34 is conditioned by the signal provided by OR gate 18 to pass alternate samples from lines N−1 and N+1, in particular samples from lines N−1 and N+1 designated by the arrows 1, 7, 3, 9, 5, etc. The multiplexer 32 is conditioned to pass intervening samples from lines N−1 and N+1, in particular the samples designated by the broken lines 6, 2, 8, 4, 10, etc. At the instant sample b is provided by SBPF 28, sample a is provided by multiplexer 34 and sample c is provided by multiplexer 32. The desired output response is (b−a) or (b+c) or more generally $$\text{OUT} = K(b+c) + (1-K)(b-a) \quad (3)$$

where K ranges from zero to one inclusive. The sample provided by scaling circuit 42 is (1−K)a and the sample provided by scaling circuit 40 and polarity inverting circuit 44 is −Kc. The combining circuit 46 combines the samples b, (1−K)a and −Kc according to the relation $$\text{OUT} = b - (1-K)a + Kc \quad (4)$$

which can be shown to be equivalent to equation 3.

Figure 4:
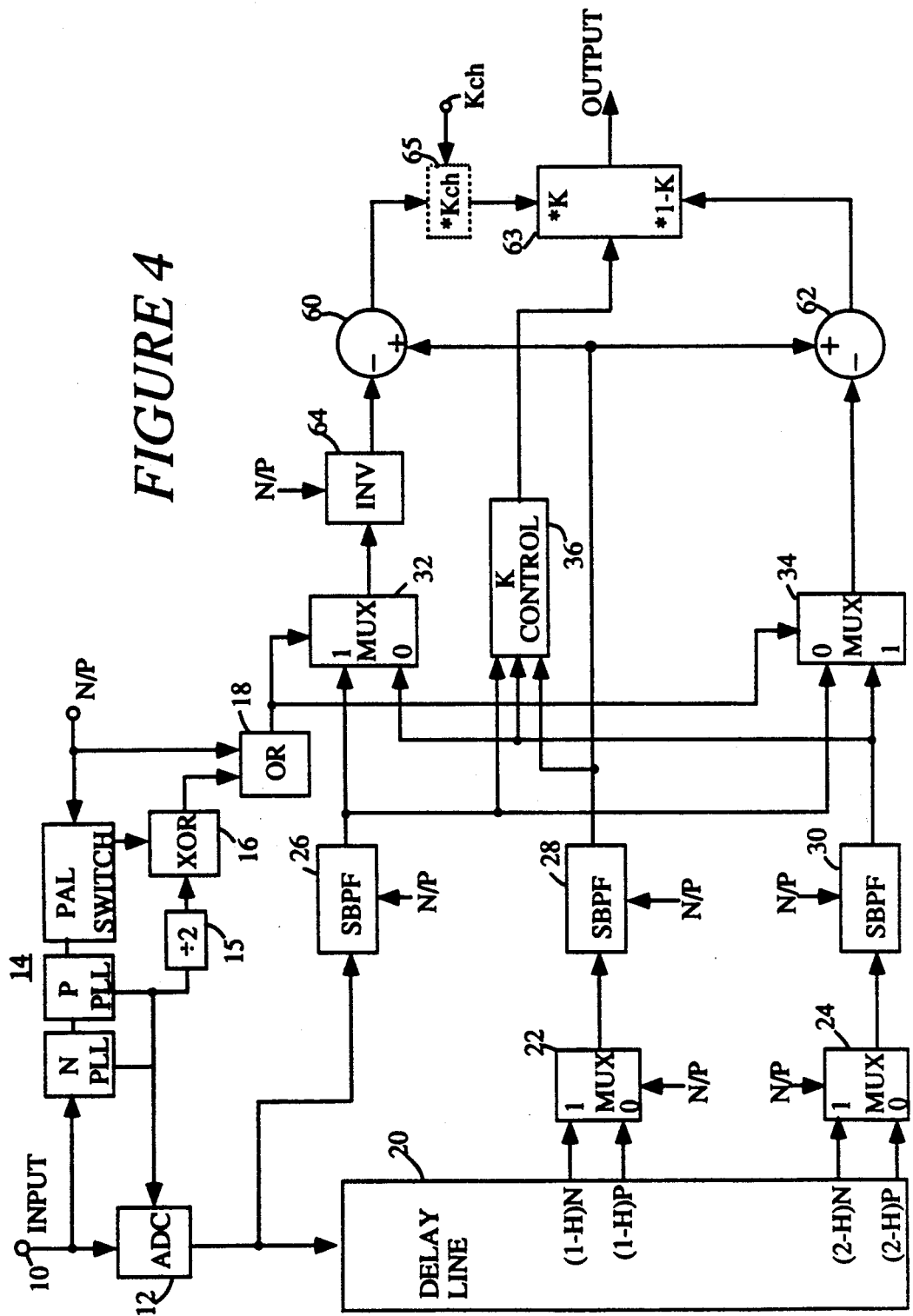

The embodiment of FIG. 3 is arranged to scale samples and then combine them in a single combining circuit to produce the comb filtered samples. The alternative embodiment illustrated in FIG. 4 is arranged to develop the alternative comb filtered samples and then to proportionally combine the alternative comb filtered samples to develop the desired output sample. In FIG. 4 circuit elements designated with like numerals to elements in FIG. 3 are similar and perform like function.

Referring to FIG. 4, the polarity inverter 64 is only conditioned to complement samples in the PAL mode of operation. The optional scaling circuit 65 is also only operative in the PAL mode and is presumed to be a short circuit in the NTSC mode.

Consider the NTSC mode of operation and make reference to the samples representing pixels a, b and c in FIG. 1. When SBPF 28 provides sample b, the multiplexers 32 and 34 provide samples c and a respectively. Sample b from SBPF 28 is coupled to the respective minuend input terminals of two subtracter circuits 60 and 62. Sample c from multiplexer 32 and sample a from multiplexer 34 are respectively coupled to the subtrahend input terminals of subtracters 60 and 62, respectively. Subtracter 60 develops the alternative comb filtered sample (b−c). Subtracter 62 develops the alternative comb filtered sample (b−a). The comb filtered samples (b−c) and (b−a) are applied to a scaling and combining circuit 63 which produces an output chrominance comb filtered sample OUTPUT according to the relationship $$\text{OUTPUT} = K(b-c) + (1-K)(b-a) \tag{5}$$

In the PAL mode of operation the multiplexer 34 produces alternate samples from lines N−1 and N+1 which alternate samples are of the opposite phase to vertically aligned samples in line N. The multiplexer 32 provides the intervening samples alternately from lines N−1 and N+1, which intervening samples are of like phase to corresponding vertically aligned samples in line N. The subtracter circuit 62 provides a line alternating subtractive comb filtered signal LASCFS. The subtracter 60, by virtue of the polarity inverting circuit 64 in its subtrahend input path provides a line alternating additive comb filtered signal LAACFS. The signals LASCFS and LAACSF are proportionately combined in the circuit 63 to produce an output comb filtered signal OUTPUT given by $$\text{OUTPUT} = (1-K)(\text{LASCFS}) + K(\text{LAACSF}) \tag{6}$$

where K ranges from zero to one. In particular during the occurrence of sample b on line N (FIG. 2), LASCFS=(b−a), LAACSF=(b+c) and $$\text{OUTPUT} = (1-K)(b-a) \tag{7}$$

which is the desired signal.

The optional scaling circuit 65 in the LAACFS path may be included to attenuate the LAACFS when the luminance component is large relative to the chrominance component. Desirably the scale factor $K_{ch}$ by which the LAACSF is attenuated approaches zero when luminance is present in the absence of chrominance, and approaches unity when chrominance is high and luminance is low. Generation of the scale factor $K_{ch}$ will be discussed hereinafter with reference to FIGS. 6, 7 and 8.

Figure 4A:
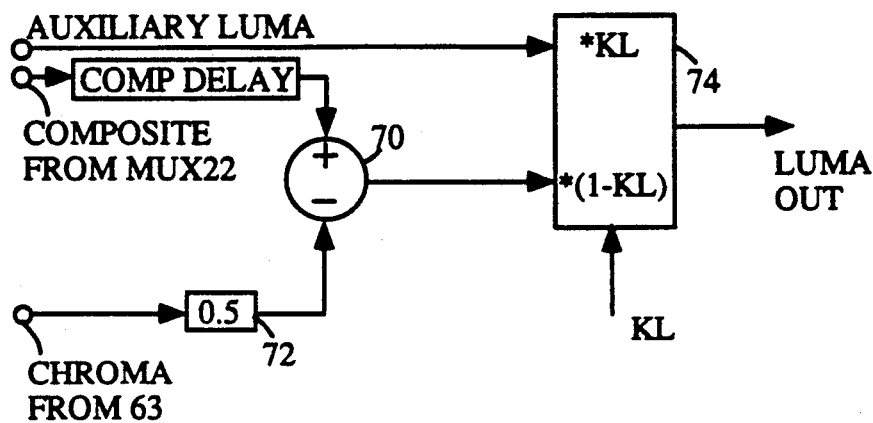
FIG. 4A is a block diagram of circuitry which may be included in the FIG. 4 circuitry to proportionally provide alternative luminance signal.

The FIGS. 3 and 4 circuits develop an adaptively comb filtered chrominance signal. If the input signal to ADC 12 is a composite video signal and a separated luminance signal is also desired the comb filtered chrominance signal may be subtracted from composite video signal available from the multiplexer 22. This is exemplified by the elements 70-72 in FIG. 4A. It may also be desired to adaptively generate a luminance signal from alternative comb filtered luminance signals. This is exemplified by element 74 in FIG. 4A. In FIG. 4A an auxiliary luminance signal, and comb filtered luminance signal from the subtracter 70 are coupled to respective input terminals of a combining circuit 74. Combing circuit 74 responsive to an adaptive control signal KL combines the comb filtered luminance signal from subtracter 70 and the auxiliary luminance signal in the proportion (1−KL) and KL respectively, to produce the luminance output signal. The value of the control signal KL ranges from zero to one. Generation of the control signal KL and the auxiliary luminance signal will be discussed hereinafter with reference to FIGS. 9 and 10.

Generation of the adaptive control signal K is performed as follows. In the NTSC mode a ratio is formed of the change in chrominance between lines N and N−1 (CC[N, N−1]) to the sum of the chrominance change between lines N and N−1 and between lines N and N+1. (CC[N, N−1]+CC[N, N+1] where CC denotes chrominance change. The chrominance change CC[N, N−1] is defined as the maximum of the differences between the pairs of samples 2, 3 and 4. The chrominance change CC[N, N+1] is defined as the maximum of the differences between the pairs of samples 7, 8 and 9. Since the phase relationship of the respective pixels of each pair is approximately 180°, a relatively accurate chrominance change may be calculated by summing the samples for each pair. Thus, if the sums of the sample pairs 2, 3 and 4 are designated S2, S3 and S4 then $$CC[N, N-1] = [\text{MAX}(|S2|, |S3|, |S4|)] \tag{8}$$

where the term on the right hand side of the equation is defined as the maximum of the absolute values of the respective sums S2, S3 and S4. Similarly $$CC[N, N+1] = [\text{MAX}(|S7|, |S8|, |S9|)] \tag{9}$$

Then $$K_{NTSC} = [\text{MAX}(|S2|, |S3|, |S4|)] / [\text{MAX}(|S2|, |S3|, |S4|) + \text{MAX}(|S7|, |S8|, |S9|)] \tag{10}$$

which is inherently limited to have values between zero and one. In a preferred embodiment it has been found to be advantageous to independently filter the chrominance differences CC[N, N−1] and CC[N, N+1] before forming the ratio. This tends to reduce artifacts generated by signal noise and to soften any color errors that may be erroneously detected. In the NTSC mode there is no preferred direction of comb filtering. When K is large and small the primary contribution to the comb filtered signals are from lines (N, N+1) and (N, N−1) respectively.

In the PAL mode the preferred comb filtering direction is such as to provide the LASCFS rather than the LAACFS. Thus, the algorithm for generating K provides a small valued K when there are small chrominance changes in the LASCFS direction and large valued K for large chrominance changes in the LASCFS direction.

The algorithm for determining the adaptive control signal K in the PAL mode is also a ratio of the chrominance difference between lines N and N−1 to the sum of the chrominance differences between lines N and N−1 and lines N and N+1. However, due to the nature of the PAL signal, the chrominance differences must be calculated differently. Referring to FIG. 2 it is seen that the respective samples of sample pairs 2, 4 and 8 are of like phase. Hence, the chrominance differences for these pairs is calculated by subtraction of the respective samples within a pair. Chrominance differences generated by the subtraction process are defined Di. The chrominance differences for pairs of samples 2, 4 and 8 are D2, D4 and D8, respectively. The respective samples of sample pairs 3, 7 and 9 are antiphase, and thus their differences may be calculated via summing. Thus the respective differences of sample pairs 3, 7 and 9 are defined S3, S7 and S9. Using the foregoing definition $$CC[N,N-1]PAL=MAX(|D2|, |S3|, |D4|) \quad (11)$$

and $$CC[N,N+1]PAL=MAX(|S7|, |D8|, |S9|) \quad (12)$$

The K ratio is formed using these values. Note in FIG. 2 that the comb filtering direction changes from line-to-line. At pixel b line N the preferred combining direction is upward, while at pixel c line N+1 the preferred combing direction is downward. This change must be accommodated in the generation of the factor K. To visualize the change, vertically interchange the broken lines and arrows between the lines N−1, N and N+1 while leaving the numerals stationary. In this instance $$CC[N,N-1]PAL=MAX(|S2|, |D3|, |S4|) \quad (13)$$

and $$CC[N,N+1]PAL=MAX(|D7|, |S8|, |D9|) \quad (14)$$

However due to the effect of multiplexers 32 and 34, equation 14 becomes the numerator of the ratio for forming K when the direction is downward.

Assuming that the input signal includes a luminance component, for identical contributions of luminance in lines N−1, N and N+1, in the PAL mode the chrominance difference signals CC[N, N−1] and CC[N, N+1] may include different contributions of luminances due to the fact that one may be a difference Di and the other a sum Si. In the PAL mode this may be compensated by inclusion of two changes to the algorithm for generating the coefficient K. The first involves substituting the term |S3| in equation 11 with a term |S3|' where |S3|' is defined $$|S3|'=MIN(|S3_L - S8_L|, |S3|) \quad (15)$$

The terms $S3_L$ and $S8_L$ correspond to the sums of sample pairs 3 and 8 but are lowpass or composite versions of the samples rather than bandpass versions. The difference $|S3_L - S8_L|$ is equivalent to the absolute value of the difference of samples representing pixels a and c. The signal $|S3_L - S8_L|$ is formed by subtracting low passed samples from SBPF's 26 and 30, (or composite video from the inputs to SBPF's 26 and 30) corresponding to pixels a and c relative to pixel b, and taking the magnitude of the difference. Substituting the term |S3|' for the term |S3| in equation 11 guarantees that K is close to zero when equivalent high frequency line-to-line luminance, as in a multi-burst pattern, is present.

The second alteration to the algorithm for the PAL mode is to scale the numerator of the K ratio and to add a constant to the denominator of the ratio. The preferred PAL algorithm for PAL is thus $$K_{PAL}=(C1* \\ CC[N,N-1])/(CC[N,N-1]+CC[N,N+1]+C2) \quad (16)$$

where the coefficient C1 is typically in the order of 1.5 and the constant C2 is about 4. These modifications tend to (a) permit K to go toward unity faster and
(b) insure that K is closer to zero when appropriate.

Figure 6:
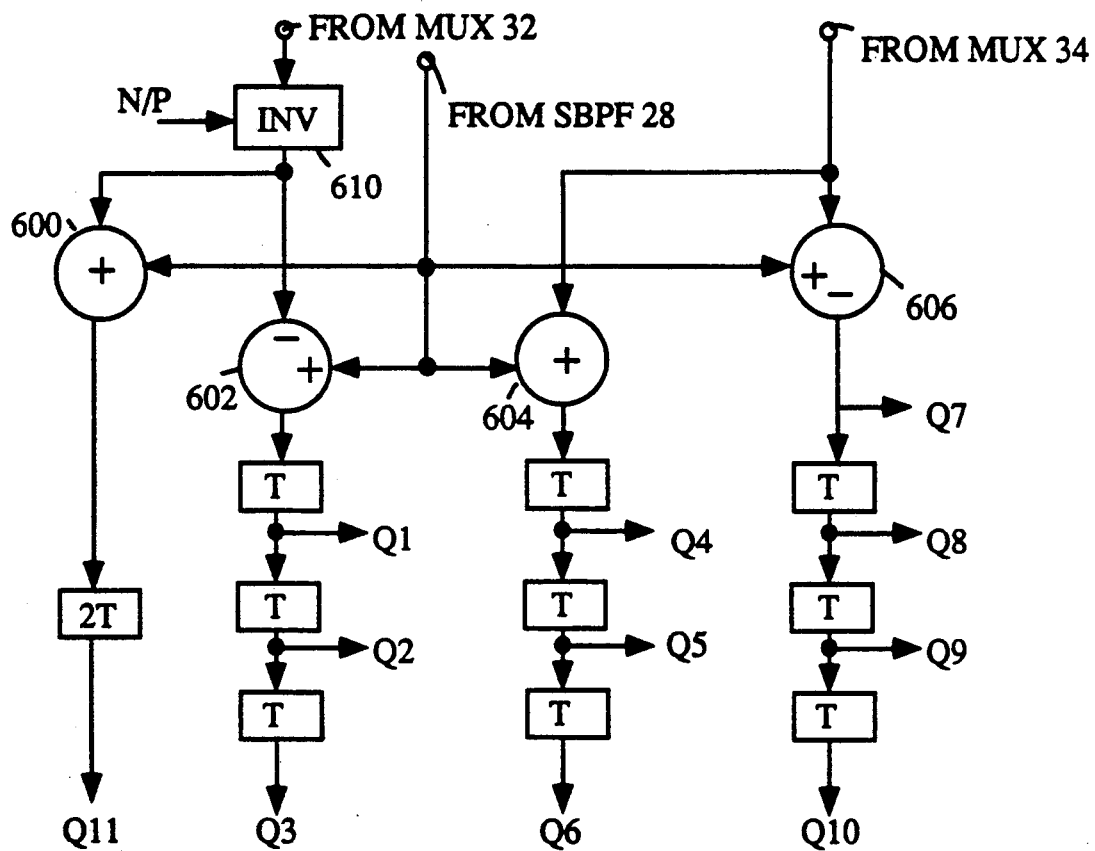
FIG. 6 is a block diagram of circuitry for providing a plurality of relatively delayed sum and difference signals.

Refer to FIG. 6 which includes circuitry for generating the required sum Si and difference Di samples for performing the calculation of the adaptive control signal K. In FIG. 6 samples from line N−1 provided by the multiplexer 34 (FIG. 4) and samples from line N provided by the SBPF 28, are coupled to respective input terminals of an adder 604 and the minuend and subtrahend input terminals of a subtracter 606. Output differences from subtracter 606 are coupled to the cascade connection of three one-sample-period delay elements which provide the delayed signals Q7–Q10. These delayed signals correspond to differences, Di of pairs of samples as indicated in Table I. Output sums from the adder 604 are coupled to the cascade connection of three one-sample-period delay elements which provide delayed signals Q4–Q6. These delayed signals correspond to sums, Si, of the pairs of samples as indicated in Table I.

Samples from line N+1 provided the multiplexer 32 are coupled to a polarity reversing or complementing circuit 610 which, responsive to the mode control signal N/P, complements samples in the NTSC mode and passes samples unaltered in the PAL mode.

Samples from the polarity reversing circuit 610 are coupled to one input terminal of an adder 600 and the subtrahend input terminal of a subtracter 602. Samples from the SBPF 28 are coupled to a second input terminal of the adder 600 and to the minuend input terminal of subtracter 602. Output samples from the subtracter 602 are coupled to the cascade connection of three one-sample-period delay elements which provide the delayed signals Q1–Q3. In the NTSC mode, the delayed signals Q1–Q3 correspond to sums, Si, of sample pairs as indicated in Table I. In the PAL mode the delayed signals Q1–Q3 correspond to the differences Di of sample pairs as indicated in Table I.

Output signal from adder 600 is coupled to one two-sample-period delay element which provides the delayed signal Q11. In the NTSC mode the signal Q11 corresponds to a comb filtered signal developed from lines N and N+1 and is equivalent to the signal provided by the subtracter 60 in FIG. 4. In the PAL mode the signal Q11 correspons to the line alternating additive comb filtered signal LAASCF.

It should be noted that signal Q9 is equivalent to a comb filtered signal developed from lines N and N−1 in the NTSC mode and to the line alternating subtractive comb filtered signal LASCSF in the PAL mode.

TABLE I

|  | Q1 | Q2 | Q3 | Q4 | Q5 | Q6 | Q7 | Q8 | Q9 | Q10 | Q11 |
|---|---|---|---|---|---|---|---|---|---|---|---|
| NTSC | S9 | S8 | S7 | S4 | S3 | S2 | D5 | D4 | D3 | D2 | D8 |
| PAL U | D4 | D8 | D2 | S9 | S3 | S7 | D5 | D9 | D3 | D7 | S8 |
| PAL D | D9 | D3 | D7 | S4 | S8 | S2 | D10 | D4 | D8 | D2 | S3 |

Table I indicates the output sums Si and differences Di provided by the signal outputs Qi of FIG. 6. The sums Si and differences Di correspond to sums and differences of pairs i of samples as designated in FIGS. 1 and 2. The table includes respective output signals for the NTSC mode in the row designated NTSC. The row designated PAL U corresponds to output signals Qi for operation in the PAL mode as per FIG. 2, where the preferred difference comb for line N (e.g., sample b) is in the up direction. The row designated PAL D corresponds to output sums and differences for operation in the PAL mode where the preferred difference comb operates in the down direction, e.g., when providing comb filtered signal representing line N−1 or line N+1.

Figure 7:
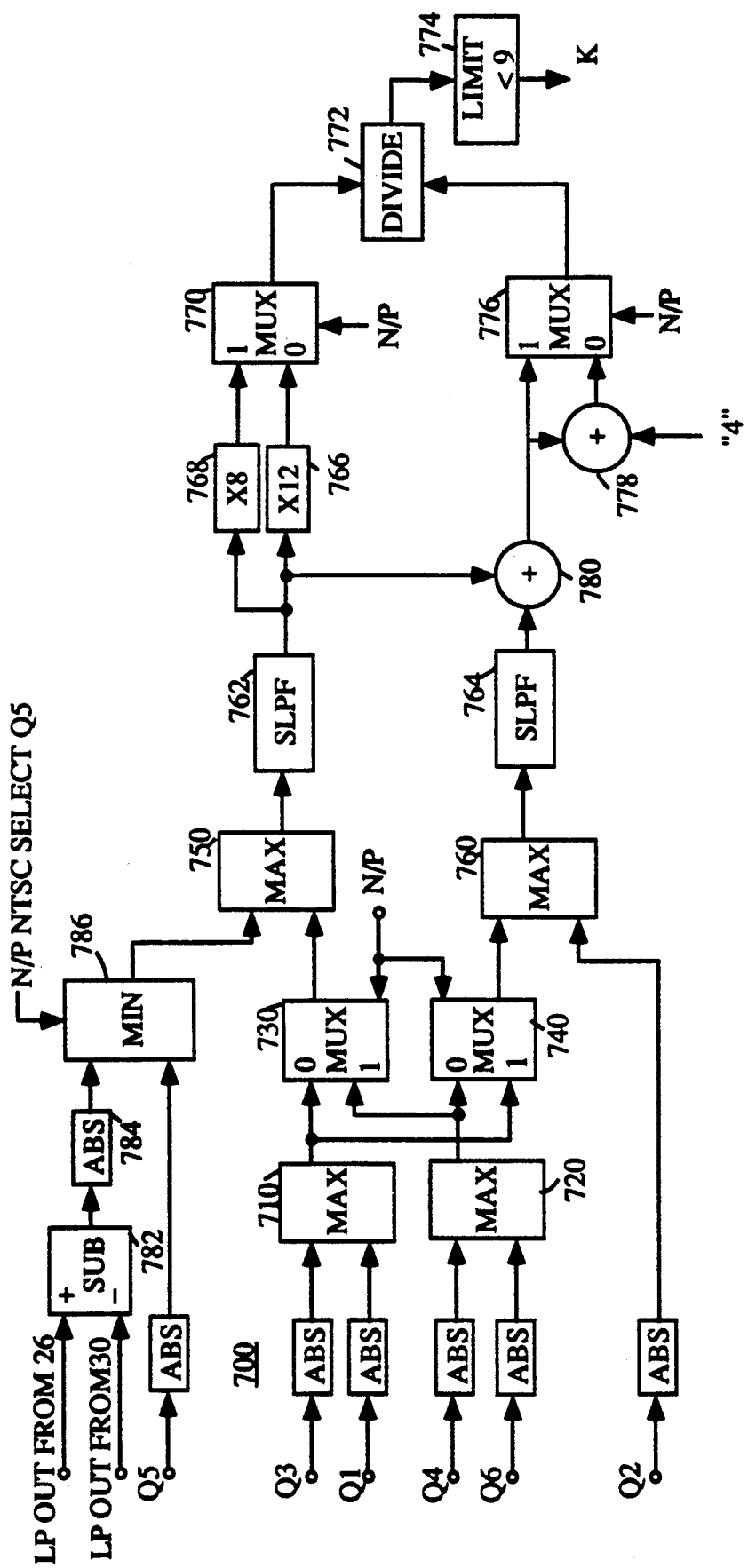
FIG. 7 is a block diagram of circuitry for providing a control signal K for adaptively controlling the circuit element 63 in FIG. 4.

FIG. 7 shows the preferred circuitry for generating the adaptive control signal K according to the preferred algorithm. The assumption is made that the weighting circuits 40 and 42 (FIG. 3) and the scaling and combining circuit 63 (FIG. 4) scale samples by eighths. The value of K represents the number of eighths and thus ranges from zero to eight corresponding to scale factors from zero to one.

In FIG. 7 respective ones of the Qi signals provided by the circuitry of FIG. 6 are applied to a bank 700 of absolute value circuits which pass only the magnitudes of the respective samples. The magnitudes of signals Q4 and Q6 are applied to a maximum detector 720 which passes the greater of the two signals, i.e., max ($|Q4|$, $|Q6|$). The output signal from the maximum detector 720 is coupled to respective first input terminals of two-to-one multiplexers 730 and 740. The magnitudes of signals Q3 and Q1 are coupled to respective input terminals of a maximum detector 710, which passes the greater of the two supplied signals to respective second input terminals of the multiplexers 730 and 740. In the NTSC mode multiplexers 730 and 740 are conditioned by the mode control signal N/P to respectively pass signals from the maximum detectors 720 and 710. In the PAL mode the multiplexers 730 and 740 respectively pass signal provided by the maximum detectors 710 and 720.

Signal passed by the multiplexer 740 is coupled to a first input terminal of a maximum detector 760 and the magnitude of signal Q2 is applied to its second input terminal. The maximum detector 760 passes the greater of the signal passed by multiplexer 740 and the signal Q2. The output of maximum detector 760 corresponds to CC[N, N+1] which equals max ($|S7|$, $|S8|$, $|S9|$) in the NTSC mode. This signal is then lowpass filtered in the lowpass filter 764.

Signal passed by the multiplexer 730 is coupled to a first input of a maximum detector 750. A second signal from a minimum detector 786 is coupled to a second input of the maximum detector 750. The magnitude of signal Q5 is applied to a first input terminal of the minimum detector 786. Signal from the LPF outputs of SBPF's 26 and 30 (or compositive video from the inputs to SBPF's 26 and 30) are applied to respective input terminals of a subtracter 782. The output signal from subtracter 782 is coupled to a second input terminal of the minimum detector 786. Minimum detector 786 is responsive to the mode control signal N/P to pass the magnitude of signal Q5 in the NTSC mode and to pass the signal $|S3|'$ in the PAL mode, where $|S3|'$ is defined by equation 15.

The maximum detector 750 passes the signal CC[N, N−1] in both the NTSC and PAL modes. In the NTSC mode this signal corresponds to MAX ($|S2|$, $|S3|$, $|S4|$) and in the PAL mode to MAX ($|D2|$, $|S3|'$, $|D4|$). The signal passed by the detector 750 is low pass filtered in low pass filter 762. The low pass filter 762 (and low pass filter 764) may be made selectable responsive to the mode control signal N/P to tailor its response to the PAL or NTSC signal spectrum or it may be of fixed design albeit such fixed design may compromise the performance of one or the other or both modes. An exemplary transfer function H(Z) for a selectable filter 762 (and 764) for NTSC signals is given by $$H(Z)_N = (1 + Z^{-1} + Z^{-2} + 2Z^{-3} + Z^{-4} + Z^{-5} + Z^{-6})/8$$

and for PAL signals is given by $$H(Z)_P = (1 + 2Z^{-2} + 2Z^{-4} + 2Z^{-6} + Z^{-8})/8$$

where Z is the conventional Z transform variable.

The signal provided by the low pass filter 762 represents the numerator of the ratio defining the adaptive control signal K. This signal is added to the signal provided by the low pass filter 764 in an adder 780 to generate the denominator (NTSC) of the K ratio. The output sum from adder 780 is coupled to one input of a multiplexer 776 and to one input of an adder 778. A constant value C2 (e.g., 4) is applied to a second input of the adder 778. The output provided by the adder 778 is the modified denominator of the K ratio for operation in the PAL mode. The output from adder 778 is coupled to a second input terminal of the multiplexer 776. The multiplexer 776, responsive to the mode control signal N/P provides the appropriate denominator value to the divisor input connection of the divide circuit 772.

The numerator value from low pass filter 762 is applied to a times 8 scaler 768 and a times 12 scaler 766 the outputs of which are coupled to respective input connections of a multiplexer 770. The scalers 768 and 766 are included to translate the K values from zero-to-one, to zero-to-eight (NTSC) and from 1.5 (zero-to-one), to 1.5 (zero-to-eight) (PAL) for the reason that the scalers 40, 42, and 63 multiply in eighths. Multiplexer 770 selects the signal scaled by the factor 8 for the NTSC mode and scaled by the factor 12 for the PAL mode. The output signal from the multiplexer 770 is coupled to the dividend input terminal of the divide circuit 772 which generates the adaptive control signal K. This signal is applied to a limiter 774 to insure that values of K do not exceed the decimal value 8 (for scaling circuits which scale by eighths).

The control signal Kch for the optional scaling circuit 65 (FIG. 4) is generated by the circuitry shown in FIG. 8. The signal Kch is to approach zero when luminance is present in the absence of chrominance and is to equal 1 when chrominance is large relative to luminance. In the FIG. 8 embodiment the Kch values are translated to the range 0–8 for the reason that the scaling circuit 65 (FIG. 4) is presumed to multiply by eighths. The algorithm performed by the circuitry of FIG. 8 is given by $$\begin{aligned} Kch &= 8\,HFLI + CI & \text{for } 0 \leq Kch \leq 8 \\ &= 8 & \text{for } Kch > 8 \end{aligned} \qquad (17)$$

where HFLI is a high frequency luminance indicator and CI is a chrominance indicator. The luminance indicator is determined from the lesser of the luminance content of sample pair 3 (FIG. 2) and the maximum of the luminance content of sample pairs 7 and 9. Note that the chrominance component of the samples of each pair 3, 7 and 9 are antiphase, so that the sums S3, S7 and S9 are substantially representative of twice the average luminance content.

The maximum of sums S7 and S9 from the multiplexer 740 (FIG. 7) is applied to one input terminal of a minimum detector 802 and the magnitude of signal Q5 (from FIG. 6) is applied to a second input terminal of the minimum detector 802. The output of the minimum detector 802 corresponds to MIN (MAX (|S7|, |S9|, |S3|)) which is equal to two times the luminance indicator.

The chrominance indicator CI for equation 17 is determined as follows. The differences, D1, D3, D5, D7 and D9, of sample pairs 1, 3, 5, 7 and 9 are first calculated, with each difference being equal to approximately two times the average chrominance. The differences (D3−D5), (D1−D3) and (D7−D9) are then calculated, each of these differences being approximately equal to four times the average chrominance. The maximum of the magnitudes of these three double differences is the chrominance indicator value.

In FIG. 8 the chrominance indicator CI is developed by subtracting the signals Q7 (FIG. 6) from signal Q9 in the subtracter 816. The output differences from the subtracter 816 are applied to a magnitude detector 818 and thereafter to one-sample-period delay elements 820 and 822. During the interval that pixel b is under consideration, the magnitude detector 818 and delay elements 820-822 provide the samples |D3−D1|, |D7−D9|, and |D3−D5|, respectively. These samples are applied to a maximum detector 824 which passes the largest of these samples to a scaler circuit 804, the output of which is equal to two times the chrominance indicator. The value 2HFLI from the minimum detector 802 and the value 2CI from the scaling circuit 804 are applied to a subtracter 806 which provides the difference value 2HFLI−2CI. These difference values are coupled to a low pass filter and limiter 808 which smooths and limits the signal to a value of 16. The filtered differences from the low pass filter/limiter 808 are subtracted from a constant value of 16 in a subtracter 810 which provides the values (16−2HFLI+2CI). The differences provided by subtracter 810 are scaled by one half in circuitry 812 to generate the values (8−HFLI+CI), which are coupled to one input terminal of a two-to-one multiplexer 814. A constant value of eight is applied to a second input terminal of the multiplexer 814. The multiplexer 814, responsive to the mode control signal N/P provides the value 8 in the NTSC mode, and the values (8−HFLI+CI) in the PAL mode.

Generation of the control signal KL for adaptively selecting alternative luminance signals (FIG. 4A) is described with reference to FIG. 9. The algorithm for determining KL is given by $$KL = Kch - (2K - 1) \quad (18)$$

where (2K−1) and KL are both limited to be greater than or equal to zero. The value of KL is chosen to equal Kch until K exceeds ½, then it falls to zero as K increases to unity. In FIG. 9, the control signal K (from the FIG. 7 circuitry) is scaled by the factor 2 in scaling circuitry 900. The value 2K from circuitry 900 and a constant value of eight are applied to respective input terminals of a subtracter 902 which provides the differences 2K−8. These differences are coupled to the subtrahend input terminal of a further subtracter 906 via a limiter 904 which constrains the differences applied to subtracter 906 to be greater than or equal to zero. The control signal Kch (from the circuitry of FIG. 8) is applied to the minuend input terminal of the subtracter 906 which provides the differences Kch−(2K−8). These differences are coupled to a first input terminal of a multiplexer 910 via a limiter 908 which constrains the difference values to be greater than or equal zero. A value of zero is applied to a second input terminal of the multiplexer 910. The multiplexer 910 is responsive to the mode control signal N/P to provide a zero value of KL in the NTSC mode, and to pass the value (Kch−2K−8) in the PAL mode. Note the range of values of KL has been translated from 0-1 to 0-8 because the scaling and combining circuitry 74 is presumed to proportion the respective signals by eighths. In addition, both signals Kch and K which are used to determine the value KL have also been translated by the factor 8.

The auxiliary luminance signal applied to the scaling and combining circuitry 74 of FIG. 4A may be generated using the exemplary circuitry of FIG. 10. The signal Q5 (in the PAL mode) is a sequence of sums of antiphase pairs of samples and as such corresponds to a line alternating luminance comb filtered signal for luminance signals in the chrominance frequency band. This signal is equivalent to a 1−H luminance comb filtered signal. The signal Q2 corresponds to a sequence of differences of pairs of samples having like chrominance phase. If the signal Q2 is subtracted from the signal Q5, the generated differences correspond to the sums of vertically aligned samples from lines N−1 and N+1, which samples have antiphase chrominance components. The generated differences thus correspond to a 2−H luminance comb filtered signal for the chrominance frequency band. Comb filtering luminance over two lines tends to average pixel errors and yield the appropriate luminance values but incurs a reduction of vertical resolution at image transitions. One line comb filtering provides better vertical resolution but chrominance differences, e.g., due to burst phase errors will not cancel. A reasonable compromise is to use the one of the 1−H and 2−H comb filtered signals having the minimum magnitude at each particular pixel.

The 2−H luminance comb filtered signal is generated (in FIG. 10) by the subtracter 952 responsive to the signals Q2 and Q5. The 1−H comb filtered luminance signal Q5 and the 2−H comb filtered luminance signal from the subtracter 952 are coupled to respective input terminals of a minimum detector 950. The minimum detector 950 passes the one of the 1−H and 2−H comb filtered luminance signals having the lesser magnitude to a scaling circuit 954 which normalizes the applied comb filtered signal. Low frequency luminance signal from the LPF output of the SBPF 28 and high frequency comb filtered luminance signal from the scaling circuit 954 are combined in an adder 958 to provide the auxiliary luminance signal which is comb filtered only in the chrominance band of frequencies.

What is claimed is:

1. A multimode comb filter, for comb filtering video signals of different video signal standards, comprising
    a signal input terminal for receiving a video signal;
    means including delay means, coupled to said signal input terminal, for selectably providing video signals representing three adjacent horizontal lines of video signal for video signals of first and second standards in first and second modes respectively;
    means including combining means, responsive to said video signals representing three adjacent horizontal lines of video signal, for generating a comb filtered signal which at an instant in time comprises a combination of video signals representing two of said three horizontal lines.

2. The multimode comb filter set forth in claim 1 wherein said means including combining means further includes means for generating a line alternating comb filtered signal in said second mode.

3. The multimode comb filter set forth in claim 1 wherein said means including delay means further includes filter means for selectively passing the frequency spectrum normally occupied by a chrominance component of said video signal, of said video signals representing three horizontal lines.

4. The multimode comb filter set forth in claim 3 wherein said filter means includes means to adjust said filter means to the frequency spectrum of said first or second standards.

5. A multimode comb filter, for comb filtering video signals of different video standards, comprising
a signal input terminal for receiving a video signal of a first or second standard;
means including delay means, coupled to said signal input terminal, said means providing video signals representing first, second and third adjacent horizontal lines of video signal of said first standard in a first mode, and providing video signals representing first, second and third adjacent horizontal lines of video signal of said second standard in a second mode;
means including scaling and combining means for generating a comb filtered signal including adaptively proportioned video signal differences between said first and second horizontal lines and video signal differences between said second and third horizontal lines in said first mode, and in said second mode including adaptively proportioned video signal differences and video signal sums, said video signal differences alternating between differences of said first and second and said second and third horizontal lines and said video signal sums alternating between sums of video signals from said second and third horizontal lines and said first and second horizontal lines in said second mode.

6. The multimode comb filter set forth in claim 5 wherein said means including scaling and combining means includes means to generate and adaptively combine a line alternating subtractive comb filtered signal and a line alternating additive comb filtered signal in said second mode.

7. The multimode comb filter set forth in claim 5 wherein said means including scaling and combining means comprises:
first means, coupled to said means including delay means, for alternately providing video signals representing said first and third horizontal lines in said second mode and providing video signal representing said first line in said first mode;
second means, coupled to said means including delay means, for alternately providing video signal representing said third and first horizontal lines in said second mode and providing video signal representing said third horizontal line in said first mode;
first combining means coupled to receive video signal representing said second horizontal line and to receive signal provided by said second means, for subtractively combining said video signal representing said second horizontal line and said signal provided by said second means, to generate a first combined signal;
second combining means, coupled to receive video signal representing said second horizontal line and to receive signal provided by said first means, said second combining means for subtractively combining said video signal representing said second horizontal line and signal provided by said first means in said first mode, and in said second mode for additively combining said video signal representing said second horizontal line and signal provided by said first means, to generate a second combined signal; and
means responsive to said video signals representing said first, second and third horizontal lines for proportionately combining said first and second combined signals to provide an output comb filtered signal.

8. The multimode comb filter set forth in claim 5 wherein said video signal received at said input terminal includes a chrominance component and a luminance component and said comb filtered signal generated by said means including scaling and combining means represents said chrominance component, said multimode comb filter further comprising:
means coupled to said means including delay means and said means including scaling and combining means for subtracting said comb filtered signal from video signal representing said second horizontal line to generate a first luminance signal;
means coupled to said means including delay means for generating an auxiliary luminance signal; and
means, responsive to said video signals representing said first, second and third horizontal lines, for providing said first luminance signal as an output luminance signal in said first mode, and for proportionally combining said first luminance and said auxiliary luminance signals to provide an output luminance signal in said second mode.

9. The multimode comb filter set forth in claim 8 wherein the means for generating said auxiliary luminance signal comprises:
means, responsive to said video signals representing said first, second and third horizontal lines, for generating a 1−H comb filtered luminance signal and a 2−H comb filtered luminance signal, both of which contain only frequency components in the frequency spectrum normally occupied by said chrominance component;
means for selecting the one of the 1−H and 2−H comb filtered luminance signals having the lesser magnitude to provide a high frequency luminance signal;
means responsive to the video signal representing said second horizontal line for providing components of said video signal not contained in the frequency spectrum normally occupied by said chrominance component, to provide a low frequency luminance signal; and
means for combining said low frequency luminance signal and said high frequency luminance signal to generate said auxiliary luminance signal.

10. The multimode comb filter set forth in claim 5 wherein said video signal includes a chrominance component quadrature modulating a subcarrier and said means including delay means further includes:
means coupled to said signal input terminal and responsive to received video signal for generating a sampling signal phase locked to said subcarrier and phase aligned to one of the quadrature axes in said first mode, and phase aligned at 45 degrees relative to one of the quadrature axes in said second mode; and sampling means, coupled to said input terminal and responsive to said sampling signal for providing sampled video signal to said delay means.

11. The multimode comb filter set forth in claim 10 wherein said means including scaling and combining means includes:

first means coupled to said means including delay means and responsive to said sampling signal for providing samples, alternately representing said first and third horizontal lines in said second mode and providing samples representing said first horizontal line in said first mode;

second means coupled to said means including delay means, and responsive to said sampling signal, for providing samples alternately representing said third and first horizontal lines in said second mode, and providing samples representing said third horizontal lines in said first mode;

first combining means, coupled to said means including delay means and said first means, for combining samples from said first means and samples representing said second horizontal line in a first polarity sense to produce a first signal;

second combining means, coupled to said means including delay means and to said second means, for combining samples from said second means and samples representing said second line in said first polarity sense in said first mode, and in a second polarity sense in said second mode to produce a second signal; and means for combining said first and second signals.

12. The multimode comb filter set forth in claim 11 wherein said means for combining said first and second signals includes means for proportioning said first and second signals.

* * * * *